(12) United States Patent
Van Nieuwstadt (10) Patent No.: US 9,080,482 B2
(45) Date of Patent: *Jul. 14, 2015

(54) CONTROL OF EXHAUST FLOW IN AN ENGINE INCLUDING A PARTICULATE FILTER

(71) Applicant: Ford Global Technologies, LLC, Dearborn, MI (US)

(72) Inventor: Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

This patent is subject to a terminal disclaimer.

(21) Appl. No.: 14/011,651

(22) Filed: Aug. 27, 2013

(65) Prior Publication Data

US 2013/0340424 A1 Dec. 26, 2013

Related U.S. Application Data

(63) Continuation of application No. 12/648,833, filed on Dec. 29, 2009, now Pat. No. 8,516,797.

(60) Provisional application No. 61/246,944, filed on Sep. 29, 2009.

(51) Int. Cl.
| | | |
|---|---|---|
| F01N 3/00 | (2006.01) | |
| F01N 3/023 | (2006.01) | |
| F01N 9/00 | (2006.01) | |
| F02B 33/44 | (2006.01) | |
| F02M 25/07 | (2006.01) | |

(52) U.S. Cl.
CPC .............. *F01N 3/0238* (2013.01); *F01N 9/002* (2013.01); *F02B 33/44* (2013.01); *F02M 25/0704* (2013.01); *F02M 25/0707* (2013.01); *F02M 25/0709* (2013.01); *Y02T 10/121* (2013.01); *Y02T 10/47* (2013.01)

(58) Field of Classification Search
USPC ........... 60/274, 278, 280, 285, 286, 295, 296, 60/311
See application file for complete search history.

(56) References Cited

U.S. PATENT DOCUMENTS

| | | | |
|---|---|---|---|
| 4,558,565 A | 12/1985 | Kojima et al. | |
| 4,630,438 A | 12/1986 | Shinzawa | |
| 4,835,964 A | 6/1989 | Kume et al. | |
| 6,164,063 A | 12/2000 | Mendler | |
| 6,250,073 B1 | 6/2001 | Zimmer et al. | |
| 7,062,904 B1 | 6/2006 | Hu et al. | |
| 7,111,455 B2 | 9/2006 | Okugawa et al. | |
| 7,299,626 B2 | 11/2007 | Barasa et al. | |

(Continued)

FOREIGN PATENT DOCUMENTS

| | | |
|---|---|---|
| EP | 0952323 | 10/1999 |
| EP | 1245817 | 10/2002 |

(Continued)

*Primary Examiner* — Binh Q Tran
(74) *Attorney, Agent, or Firm* — Julia Voutyras; Alleman Hall McCoy Russell & Tuttle LLP (57) ABSTRACT

Methods and systems for controlling operation of exhaust of an engine including a particulate filter are provided. One example method includes generating vacuum during engine operation, and storing the vacuum. The method further includes, during or after engine shutdown, drawing ambient air through the particulate filter via the vacuum.

19 Claims, 5 Drawing Sheets

(56) References Cited

U.S. PATENT DOCUMENTS

| | | |
|---|---|---|
| 7,410,529 B2 | 8/2008 | Sellers et al. |
| 7,482,303 B2 | 1/2009 | Bosteels |
| 7,607,293 B2 * | 10/2009 | Tamai et al. ............... 60/289 |
| 8,136,343 B2 | 3/2012 | Zawacki et al. |
| 8,136,505 B2 | 3/2012 | Ruhland et al. |
| 8,181,452 B2 | 5/2012 | Bidner et al. |
| 8,327,628 B2 | 12/2012 | Ruona et al. |
| 8,336,300 B2 | 12/2012 | Hepburn et al. |
| 8,341,947 B2 | 1/2013 | Hepburn et al. |
| 8,347,613 B2 | 1/2013 | Van Nieuwstadt |
| 8,359,839 B2 | 1/2013 | Van Nieuwstadt et al. |
| 8,359,840 B2 | 1/2013 | Van Nieuwstadt et al. |
| 8,387,370 B2 | 3/2013 | Van Nieuwstadt et al. |
| 8,402,751 B2 | 3/2013 | Bidner et al. |
| 8,407,988 B2 | 4/2013 | Bidner et al. |
| 8,424,295 B2 | 4/2013 | Bidner et al. |
| 8,438,840 B2 | 5/2013 | Bidner et al. |
| 8,438,841 B2 | 5/2013 | Bidner et al. |
| 8,453,446 B2 * | 6/2013 | Onishi et al. ............... 60/605.2 |
| 8,464,514 B2 | 6/2013 | Kerns et al. |
| 8,516,797 B2 * | 8/2013 | Van Nieuwstadt ............ 60/285 |
| 8,608,834 B2 * | 12/2013 | Sellers et al. ............... 95/279 |
| 2005/0019578 A1 | 1/2005 | Bosteels |
| 2006/0179825 A1 | 8/2006 | Hu et al. |
| 2007/0220873 A1 | 9/2007 | Bosteels |
| 2009/0120071 A1 | 5/2009 | Gandhi et al. |
| 2011/0072787 A1 | 3/2011 | Hubbard et al. |
| 2011/0072801 A1 | 3/2011 | Lupescu et al. |
| 2011/0073088 A1 | 3/2011 | Hubbard et al. |

FOREIGN PATENT DOCUMENTS

| | | |
|---|---|---|
| EP | 1319811 | 6/2003 |
| JP | 2001263053 | 9/2001 |
| JP | 2001263130 | 9/2001 |
| JP | 2004232544 | 8/2004 |
| JP | 2004251230 | 9/2004 |
| JP | 2006161572 | 6/2006 |
| JP | 2007291980 | 11/2007 |
| JP | 2009030547 | 2/2009 |
| JP | 2009041386 | 2/2009 |
| JP | 2009079487 | 4/2009 |
| JP | 2009085054 | 4/2009 |
| JP | 2009228448 | 10/2009 |
| WO | 2008127755 | 10/2008 |

* cited by examiner

CONTROL OF EXHAUST FLOW IN AN ENGINE INCLUDING A PARTICULATE FILTER

CROSS-REFERENCE TO RELATED APPLICATION

This application is a continuation of U.S. patent application Ser. No. 12/648,833 filed Dec. 29, 2009, now U.S. Pat. No. 8,516,797, which claims priority to U.S. Provisional Patent Application Ser. No. 61/246,944, entitled "PARTICULATE FILTER REGENERATION DURING ENGINE SHUTDOWN," filed Sep. 29, 2009, the entire contents of each of which are hereby incorporated by reference for all purposes.

TECHNICAL FIELD

The present application relates generally to an engine having an exhaust system which includes a particulate filter.

BACKGROUND AND SUMMARY

Direct injection (DI) engines may produce more soot than port fuel injected engines in part due to diffuse flame propagation. As a consequence of diffuse flame propagation, fuel may not adequately mix with air prior to combustion, resulting in pockets of rich combustion that generate soot. Further, DI engines may be susceptible to generating soot during high load and/or high speed conditions when there is a lack of sufficient air and fuel mixing.

The inventors herein have recognized various issues in applying particulate filters to DI, spark-ignition engines. For example, it can be difficult to maintain accurate emission control during particulate filter regeneration in a DI, spark-ignition engine.

Thus, methods and systems for controlling operation of exhaust of an engine including a particulate filter are described herein. One exemplary method includes generating a vacuum during engine operation and storing the generated vacuum. Ambient air can be drawn through the particulate filter via the vacuum during and/or after engine shutdown to at least partially regenerate the particulate filter.

By performing the regeneration during and/or after engine shutdown, the particulate filter can be regenerated by an increased flow of oxygen to the particulate filter while avoiding potential increased emissions from a three-way catalyst in an exhaust tailpipe.

In one example, the vacuum may draw fresh air in a reverse direction through the filter. By controlling the system to draw fresh air into the particulate filter in a direction that is the reverse of a direction of exhaust flow during engine combustion, improved removal of soot may be achieved.

Yet another potential advantage of regenerating the filter during and/or after engine shutdown using stored vacuum is that a regeneration reaction can be delayed or advanced to a time when particulate filter conditions are appropriate for carrying out the regeneration reaction. For example, the stored vacuum may be stored until the particulate filter temperature becomes hot enough to carry out the regeneration reaction due to natural temperature increases that can occur after an engine shutdown. Further still, particulate filter regeneration may be selectively carried out under particular engine shutdown conditions (e.g., shutdowns in which filter regeneration is already commenced during engine running conditions, or shutdowns in which filter temperature is high enough), and not during others.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for regenerating a particulate filter in an engine, such as a direct injection gasoline engine. During a first operating condition of the engine, combustion in the engine may be carried out about stoichiometry and exhaust gas may flow from the engine in a first direction, to a particulate filter where soot generated by the engine is collected. During engine operation, vacuum generated by engine spinning (or pressure generated by turbocharger motion) may be stored in the intake system, such as in the intake manifold. Then during a subsequent engine shutdown (e.g., during engine spin-down after combustion has stopped, or during engine rest), the stored vacuum or pressure may be applied to generate regeneration flow to the filter. For example, stored vacuum may be used to draw fresh air into the filter from ambient atmosphere (e.g., via the tailpipe and/or engine inlet) in a second, reverse direction, to aid in filter regeneration. Alternatively, stored pressure may be used to push fresh air from the intake manifold to the filter to aid in filter regeneration In some embodiments, one or more exhaust gas recirculation (EGR) systems may be utilized to allow the fresh ambient air to flow from the filter to the stored vacuum. For example, when a vacuum is created in an intake manifold, fresh air may flow into the intake system, through a low pressure EGR system toward the particulate filter, then back through a high pressure EGR system to an area of low pressure (e.g., vacuum) stored in the intake manifold. In other embodiments, fresh air may be drawn in through the tailpipe, through the particulate filter, and then through an EGR system (e.g., a high pressure EGR system) to low pressure in the intake manifold, or elsewhere in the intake system. Still other variations may also be used.

Figure 1:
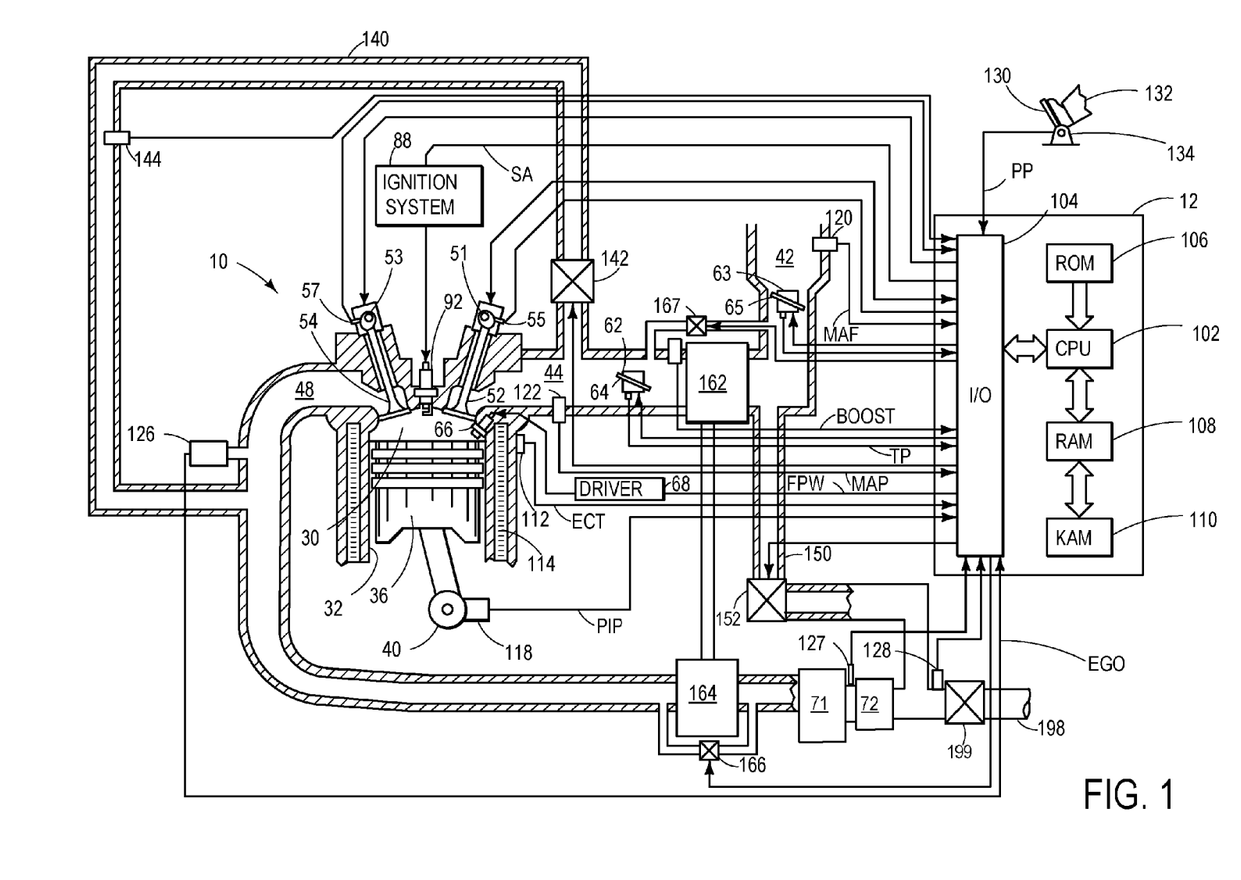
FIG. 1 shows a schematic diagram of an engine with a turbocharger and an exhaust gas recirculation system.

Turning now to FIG. 1, a schematic diagram shows one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders, and may also be operated to control a vacuum or pressure in the intake manifold, as will be discussed. The positions of throttle plates 64 and 65 may be provided to controller 12 by throttle position signals TP. Intake passage 42 may include a mass air flow sensor 120 and a manifold air pressure sensor 122 for providing respective signals MAF and MAP to controller 12.

Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Further, turbine 164 may include wastegate 166 to regulate the boost pressure of the turbocharger. Similarly, intake manifold 44 may include valved bypass 167 to route air around compressor 162.

As shown, throttle 62 is positioned downstream of compressor 162 and downstream of the valved bypass 167, and throttle 63 is positioned upstream of both the compressor 162 and the valved bypass 167. Selective control of these throttles, as positioned, may allow for greater control of generation and storage of vacuum or increased pressure in a portion of the intake manifold. As will be discussed, the generation of vacuum or increased pressure in said portion of the intake manifold is used for regeneration of the particulate filter.

In the disclosed embodiments, and as illustrated in FIG. 1, an exhaust gas recirculation (EGR) system may route a desired portion of exhaust gas from exhaust passage 48 to intake manifold 44 via high pressure EGR (HP-EGR) passage 140 or low pressure EGR (LP-EGR) passage 150.

An HP-EGR passage 140 may have a first opening upstream of the turbine and particulate filter, such that exhaust gas can be routed from upstream of the turbine 164 of the turbocharger to a second opening downstream of the compressor 162 of the turbocharger and the throttle 62 during engine combustion. The LP-EGR passage 150 may have a first opening downstream of the turbine 164 and downstream of device 72 (e.g., particulate filter) such that exhaust gas can be routed from downstream of the particulate filter 72 to a second opening upstream of the compressor 162 yet downstream of throttle 63, during engine combustion. In some embodiments, engine 10 may include only an HP-EGR system or only an LP-EGR system.

An amount of EGR flow may be varied by selective control of HP-EGR valve 142 or LP-EGR valve 152 during engine combustion operation. Further, an EGR sensor, such as HP-EGR sensor 144, may be arranged within either or both of the HP-EGR and LP-EGR passages and may provide an indication of one or more of pressure, temperature, and concentration of the exhaust gas therein. Alternatively, the HP-EGR valve and/or LP-EGR valve may be controlled through a calculated value based on signals from the MAF sensor (upstream of throttle 63), MAP (intake manifold), MAT (manifold gas temperature) and the crank speed sensor. Further still, flow through either or both of the HP-EGR and LP-EGR passages may be controlled based on an exhaust $O_2$ sensor and/or an intake oxygen sensor (e.g., in an intake manifold). Under some conditions, an EGR system may be used to regulate the temperature of the air and fuel mixture within the combustion chamber.

Exhaust gas sensor 126 is shown coupled to exhaust passage 48 upstream of emission control system 70. Further, sensor 127 is shown coupled to exhaust passage 48 upstream of particulate filter 72 and sensor 128 is shown coupled to exhaust passage 48 downstream of particulate filter 72. Sensors 126, 127, and 128 may be a combination of any suitable sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Emission control devices 71 and 72 are shown arranged along exhaust passage 48 downstream of exhaust gas sensor 126. Device 71 and device 72 may include a selective catalytic reduction (SCR) system, three way catalyst (TWC), $NO_x$ trap, various other emission control devices, or combinations thereof. For example, device 71 may be a TWC and device 72 may be a particulate filter (PF). In some embodiments, where device 72 is a particulate filter, device 72 may be located downstream of device 71 (as shown in FIG. 1). In other embodiments, device 72 may be a particulate filter positioned upstream of device 71, which may be a TWC (this configuration not shown in FIG. 1). Further, in some embodiments, during operation of engine 10, emission control devices 71 and 72 may be periodically reset by operating at least one cylinder of the engine within a particular air/fuel ratio. In still further embodiments, device 72 (e.g., particulate filter) may be regenerated while the engine is shut down (e.g. not combusting), as will be described in detail below. Additionally, a tailpipe valve 199 is shown downstream of device 72 in exhaust tailpipe 198. The tailpipe valve 199 may be controlled by controller 12, in order to control pressure in the exhaust. This will be discussed in detail below.

Controller 12 is shown in FIG. 1 as a microcomputer, including microprocessor 102, input/output ports 104, an electronic storage medium for executable programs and calibration values shown as read only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read only memory 106 can be programmed with computer readable data representing instructions executable by microprocessor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
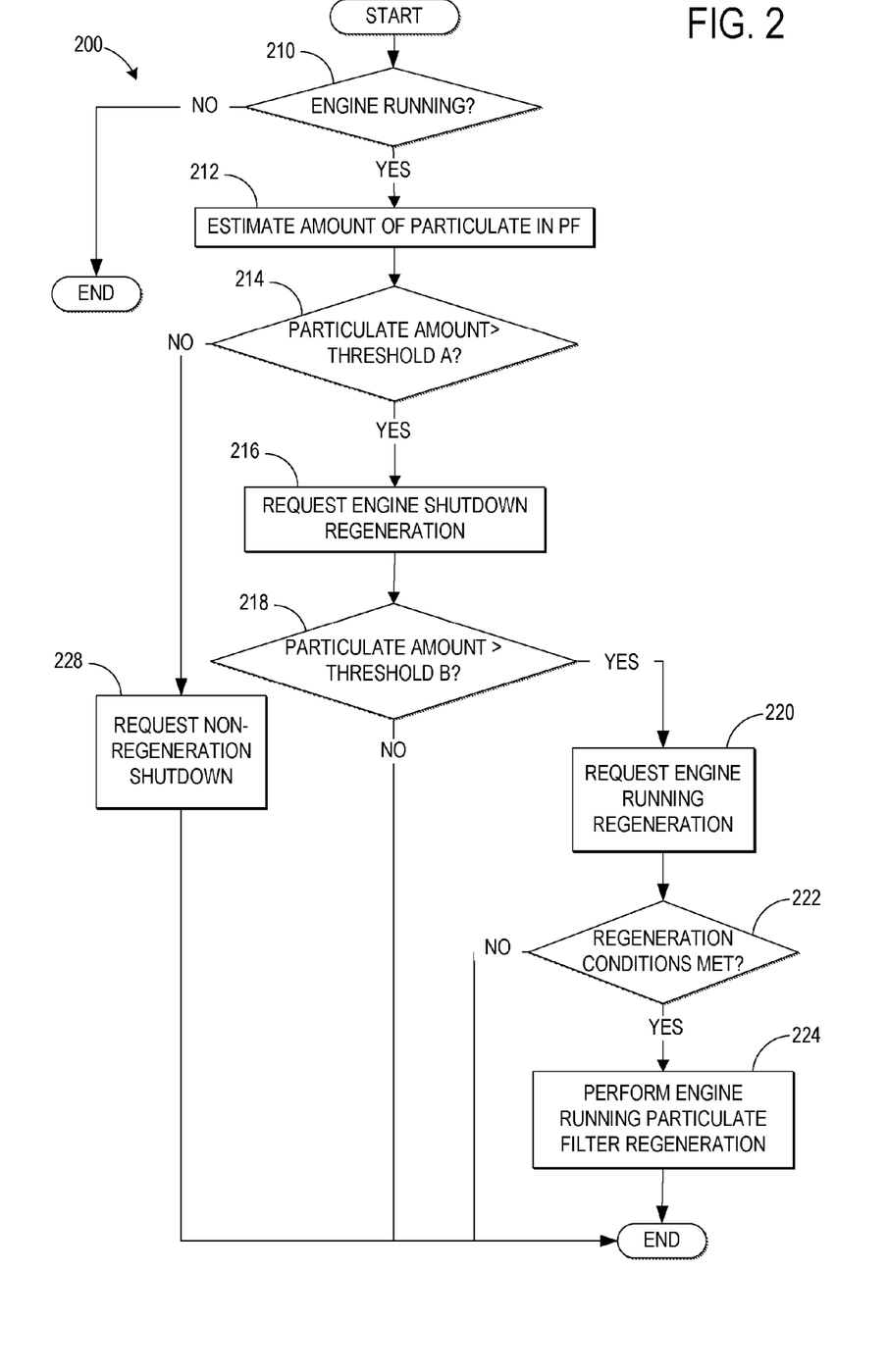
FIG. 2 shows a flowchart illustrating a method for managing particulate filter regeneration in a direct injection gasoline engine in a vehicle.
Figure 3:
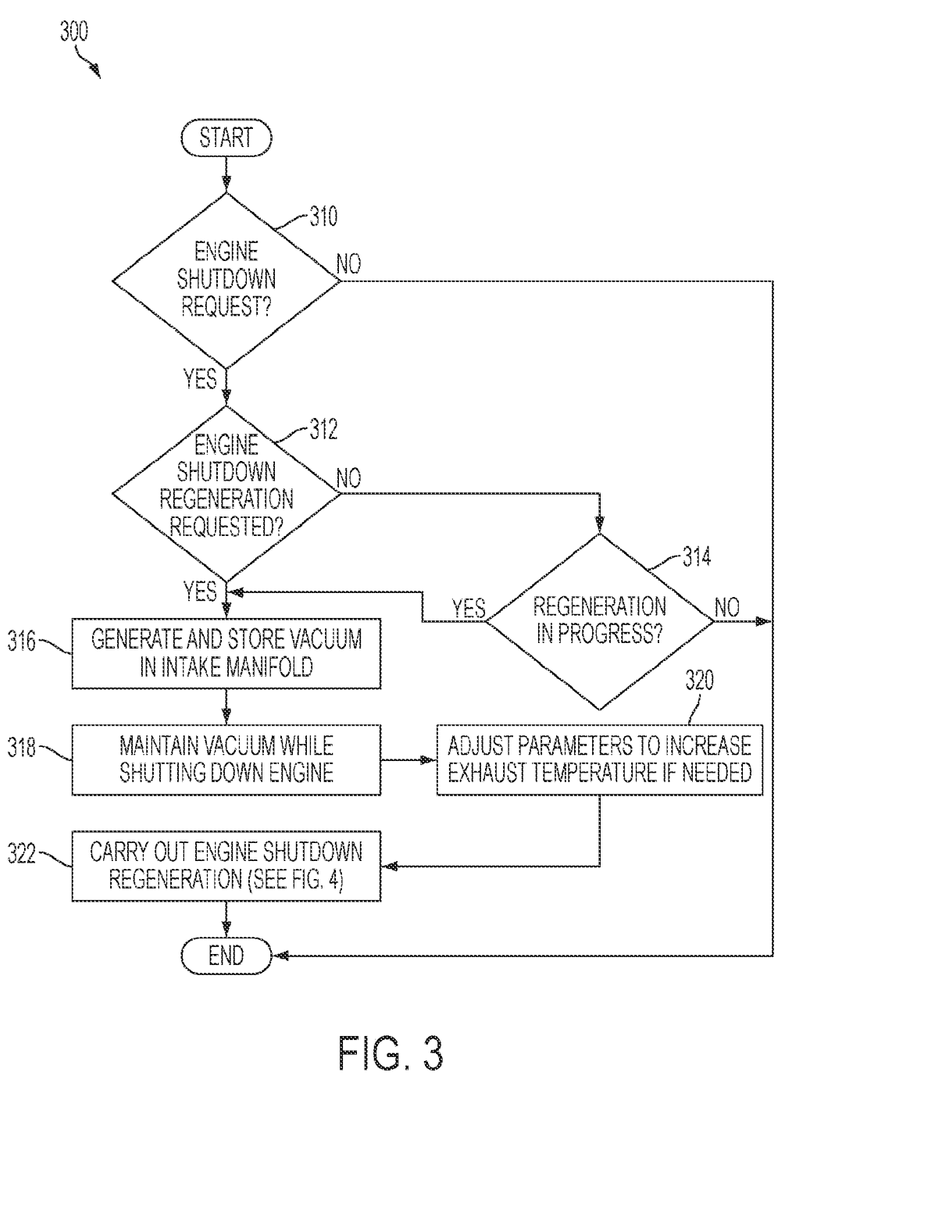
FIG. 3 shows a flowchart illustrating a method for storing vacuum during engine shutdown.
Figure 4:
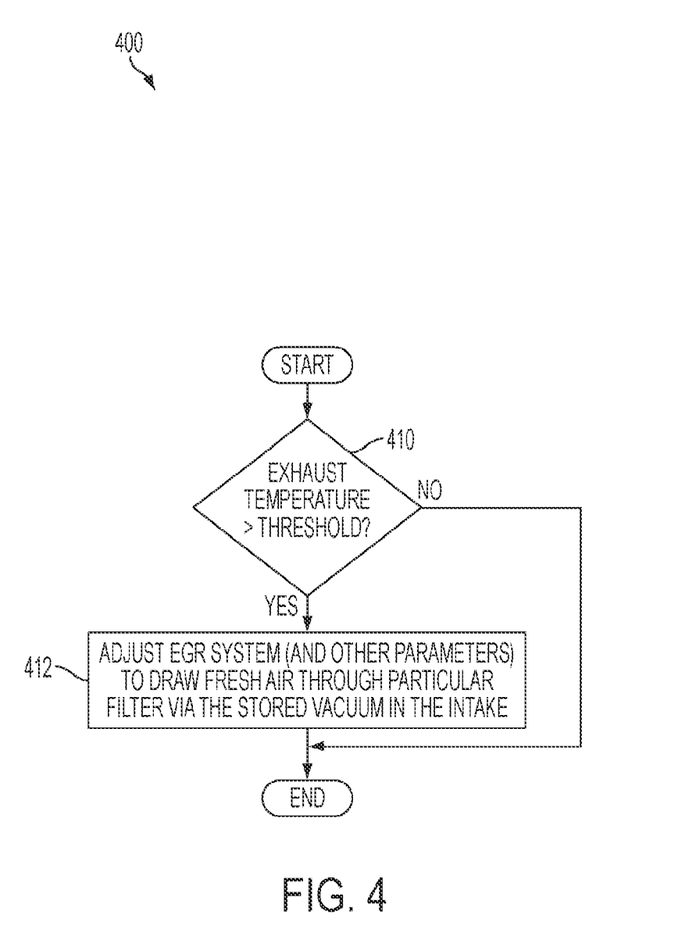
FIG. 4 shows a flowchart illustrating a method for regenerating a particulate filter during engine shutdown, using stored vacuum.
Figure 5:
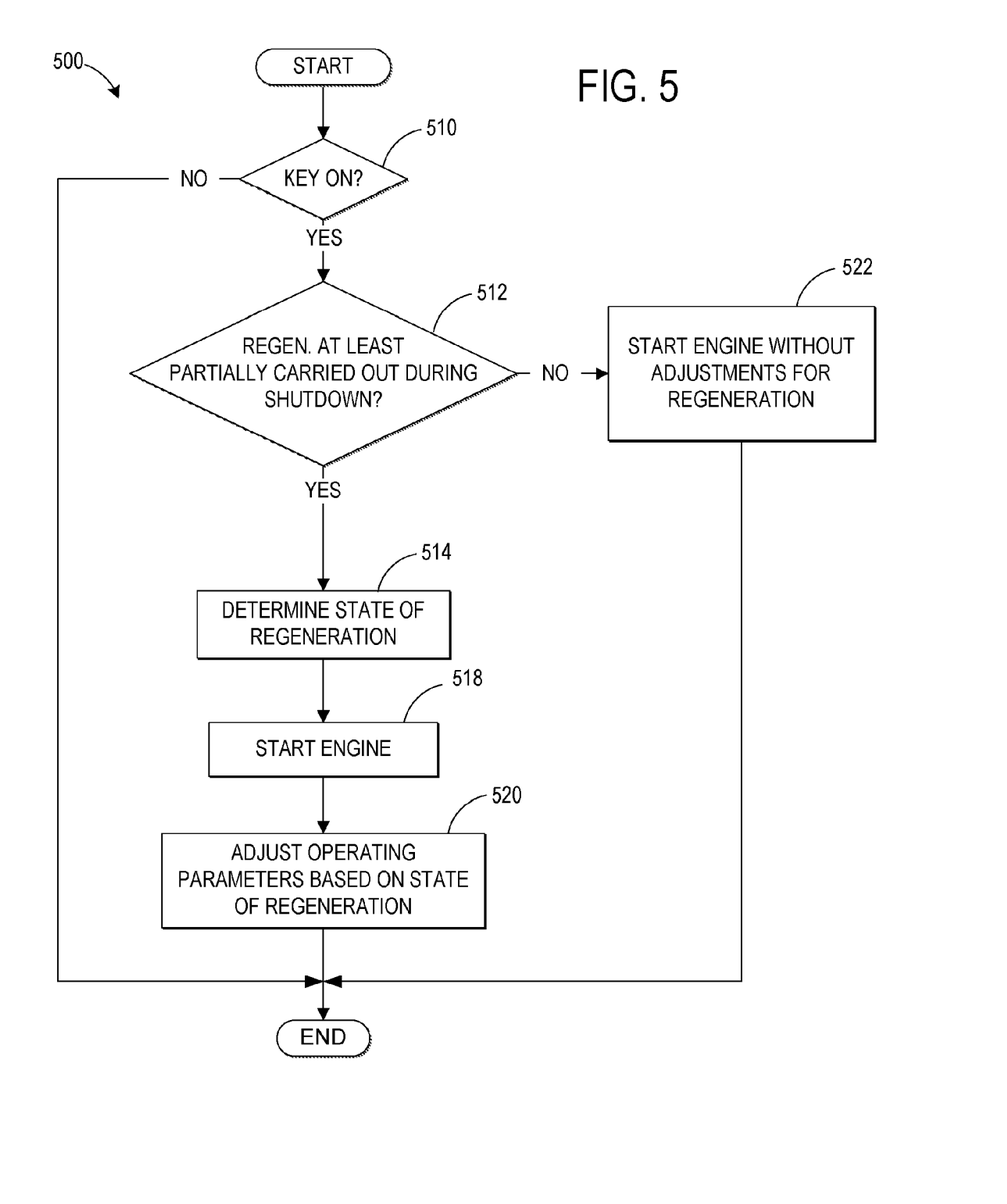
FIG. 5 shows a flowchart illustrating a method for starting an engine based on filter regeneration carried out during and/or after a previous engine shutdown.

Example control routines for an engine, such as engine 10 described above with reference to FIG. 1 are shown and described with respect to FIGS. 2-5. FIG. 2 is a flowchart illustrating a method for managing particulate filter regeneration in a direct injection gasoline. FIG. 3 illustrates example engine shutdown control for storing vacuum. FIG. 4 is a flowchart illustrating control of an engine shutdown, or engine rest, regeneration using stored vacuum, and FIG. 5 is a flowchart illustrating an example routine for starting an engine that takes into account whether, and to what extent and/or duration, engine shutdown filter regeneration was carried out before said starting of the engine.

Turning now to FIG. 2, an operational flow chart illustrating a method 200 for managing regeneration of a particulate filter downstream of an engine, such as engine 10 shown in FIG. 1, is shown. Specifically, method 200 demonstrates example operation for managing particulate filter regeneration of a direct injection gasoline engine, based on engine operating conditions. The method 200 determines whether engine shutdown regeneration is requested, and also determines a timing for an engine shutdown regeneration.

At 210 of method 200, the method includes determining whether the engine is running. This may include determining whether the engine is spinning and carrying out combustion of one or more cylinders. In one example, combustion may include oscillation of the engine air-fuel ratio about stoichiometry, where exhaust gas flows from the engine, through a turbine (e.g., turbine 164), and then through a three-way catalyst (e.g., device 71) and a particulate filter (e.g., device 72) before exiting through a tailpipe (e.g., exhaust tailpipe 198). If the engine is not running, the method 200 may end. If the engine is running, the method 200 may proceed to 212.

At 212, an amount of particulate (e.g., soot) in the particulate filter is estimated. In some embodiments, this may include estimating an amount of soot in the particulate filter based on a pressure drop across the particulate filter. In other embodiments, a soot accumulation model may be utilized to estimate the amount of soot in the particulate filter. Once the amount of soot is determined, the method continues to 214 to determine if the amount of soot is greater than a threshold amount (e.g., a first, lower threshold A) which may be used as an indication of whether or not to regenerate the particulate filter during and/or after an engine shutdown.

If the estimated amount of soot is less than the threshold A, as determined at 214, the method 200 may continue to 228 where a non-regeneration engine shutdown is requested (e.g., where, if the engine is shut down, the particulate filter is not regenerated during engine shutdown and/or during engine rest). For example, the method 200 may include setting a flag indicating that a request for non-regeneration engine shutdown has been established. On the other hand, if the estimated amount of soot exceeds the threshold A, the method 200 may proceed to 216 to request an engine shutdown regeneration (see FIG. 3).

Then, the method 200 may continue to 218 to determine if the amount of particulate stored in the particulate filter is greater than a threshold amount (e.g., a second, higher threshold B), which may be used as an indication of whether or not to regenerate the particulate filter during engine running, or engine combustion (e.g., before an engine shutdown). If the answer to 218 is yes, the method 200 may continue to 220 to request an engine running regeneration at 220. Otherwise, the method 200 may end.

At 222, the method 200 includes determining whether regeneration conditions have been met. For example, it may be determined whether exhaust temperature is greater than a threshold (e.g., a minimum regeneration temperature), or other conditions. In this way, a regeneration reaction can be delayed or advanced to a time when particulate filter conditions are appropriate for carrying out the regeneration reaction. For example, the stored vacuum or pressure may be stored until the particulate filter temperature becomes hot enough to carry out the regeneration reaction.

At 224, the routine performs the engine running particulate filter regeneration. In some examples, an engine running particulate filter regeneration may include adjusting engine operation to raise exhaust gas temperature sufficiently high to initiate filter regeneration with excess oxygen. For example, engine speed can be increased, throttling may be increased, etc. to increase exhaust gas temperature. During engine running regeneration, the excess oxygen directed to the particulate filter for particulate filter regeneration may be supplied via one or more of the EGR systems (e.g., by delivering pressurized air from the intake to the exhaust, thus bypassing the engine), via an air pump delivering airflow upstream of the particulate filter and downstream of the three way catalyst, by operating with lean combustion in the engine, or combinations thereof. In one example, during the engine running regeneration of 224, excess oxygen flows to and through the particulate filter in a direction from the exhaust manifold, or engine output side of the particulate filter to the tailpipe, or atmospheric side of the particulate filter. Various operating parameters may be adjusted to control the filter regeneration rate, temperature of the exhaust and/or particulate filter, etc.

Referring now to FIG. 3, a method 300 illustrating additional details of engine shutdown control is described. First, at 310, the method 300 includes determining whether an engine shutdown request has been made. For example, the engine shutdown request may be generated from an operator indicating a request to shut down the vehicle (e.g., by a turn-off the vehicle via a key position of the vehicle). The engine shutdown request may also be generated based on vehicle operating conditions where engine output torque is not needed, for example, during deceleration conditions where the requested engine torque is less than zero, or in response to a driver tip-out. In still another example, the engine shutdown request may be generated from a hybrid-vehicle controller if an engine is in a hybrid electric vehicle, where an engine shutdown can be carried out while the vehicle continues to operate and/or travel, driven by a hybrid propulsion system.

When the answer to 310 is yes, the routine continues to 312 to determine whether engine shutdown regeneration was requested (e.g., at 220 of method 200). If so, the method 300 continues to 316. Otherwise, the method 300 may continue to 314 to determine if an engine running regeneration is already in progress at the time of the engine shutdown request. In this case, even though an engine shutdown regeneration was not specifically requested, in some conditions, it may be beneficial to extend the engine running regeneration through engine shutdown. For example, the regeneration may be extended from engine running operation, through engine spin-down, and through at least a portion of engine rest. Thus, if the answer to 314 is yes, the method 300 may also continue to 316, at least under selected conditions (e.g., when there is a sufficient amount of particulate stored in the filter, greater than a minimum amount C) to warrant extending regeneration through the engine shutdown. In this example, the operations indicated at 316-322 of the method 300 may be carried out while particulate filter regeneration is already underway. Otherwise, the method 300 may end.

If the answer to 314 is no, the method 300 may carry out a non-regeneration engine shutdown (not shown). For a non-regeneration engine shutdown, the method 300 may include reducing, or avoiding a storing of increased pressure and/or vacuum during the engine shutdown, and thus does not include drawing in fresh air during engine shutdown operation to regenerate, or extend regeneration of, the particulate filter. Accordingly, particulate filter regeneration may be selectively carried out under particular engine shutdown conditions (e.g., engine shutdowns in which filter regeneration is already commenced during engine running conditions) in some cases, and not during others.

At 316, the method 300 includes adjusting engine operation to generate and/or store vacuum in the intake manifold. In order to create vacuum in the intake manifold, engine boost may be reduced (via adjustment of a turbine wastegate or a valved bypass of a compressor, for example), and a throttle opening may also be reduced during engine shutdown. The reduction of engine boost and/or throttle opening may be initiated during engine spin-down. By reducing a throttle opening to be nearly closed, an increased vacuum can be generated in the intake manifold. In another example, the HP-EGR valve may also be closed during engine spin-down, in order to create vacuum and/or increase an amount of vacuum in the intake manifold.

Alternately, at 316, the method may include adjusting operation to generate and/or store compressed intake gasses (e.g., pressure). The stored pressure may be generated in the intake manifold by increasing engine boost and throttle opening before the engine stops spinning. In this way, pressure in the intake manifold, can be generated and stored (e.g., at a sufficiently high rate and/or under selected conditions such that the engine may not utilize the pressure). In some cases, the tailpipe valve may be closed during a portion of engine shutdown to increase intake manifold pressure.

Additional adjustments to further increase stored pressure or stored vacuum (e.g., in the intake manifold) may be carried out, such as adjusting valve timing. Such adjustments may be concurrent with discontinuing combustion in one or more (e.g., all) of the engine cylinders. In this way, it is possible to either increase pressure or generate vacuum in the intake manifold via the rotating engine during engine spin-down, even if the engine speed is decelerating. Compressed air and/or a vacuum may be generated and stored either before, or after discontinuation of combustion, and either before or during engine spin-down. Further, while this example illustrates storing pressure and/or vacuum in the intake manifold, pressure and/or vacuum may be stored at other locations in the intake, such as a pressure or vacuum storage tank coupled to the intake manifold. Further, pressure and/or vacuum can be stored at any location in the air circulation circuits of an engine, provided there are appropriate valves and controls for controlling the generation, storage, and movement of the stored pressure or vacuum.

Next, at 318, the routine maintains vacuum (or increased pressure) in the intake manifold, for example, by positioning the throttle in a sealed closed position in the intake passage. To maintain pressure in the intake manifold, the throttle may be closed at a maximum air charge, or when a maximum air charge exists in the portion of the intake manifold that stores the generated pressure. To maintain vacuum in the intake manifold, the throttle may be moved from almost closed to fully closed as the engine spins down to rest, such that the throttle is fully closed as engine speed drops below a minimum engine speed, such as 50 RPM. By sealing the throttle closed and by stopping the engine at a position such that there is little or no communication between the intake manifold and exhaust manifold through one or more cylinders of the engine (e.g., without positive valve overlap of any one cylinder in the rest position), it may be possible to temporarily store the generated vacuum (or compressed intake gasses) even after the engine comes to rest. The LP-EGR valve, HP-EGR valve, compressor valved bypass, turbine wastegate, and/or tailpipe valve may also be sealed closed in order to assist in the storage of the generated vacuum, or compressed air.

During the engine shutdown, the method may include adjusting operating parameters to increase exhaust temperature at 320. For example, if a particulate filter temperature is less than a threshold temperature, increasing exhaust temperature may include operating the engine with a retarded spark timing to increase exhaust temperature in preparation for shutdown regeneration. This may be carried out for a selected number of combustions, including one or more last combustion events before discontinuing combustion.

At 322, the method 300 includes carrying out the engine shutdown regeneration. In one example, the method 300 may include temporarily storing the compressed air or generated vacuum in the intake until a peak particulate filter temperature, or temperature range, is reached, and thereafter dissipating the compressed air or stored vacuum at 322. For example, stored vacuum may be dissipated by opening a tailpipe valve and thus drawing in fresh air, where the fresh air passes through the particulate filter. Because temperatures may temporarily rise after a shutdown operation, the method 300 may include holding the compressed air or the vacuum until the peak filter temperature, or temperature range, is reached, before adjusting one or more valves to use the vacuum or compressed air to increase oxygen flow to the particulate filter, and thus regenerate the particulate filter. In this way, fresh air will be drawn in to a particulate filter when it is subject to a favorable temperature for carrying out the regeneration reaction. In another example, the method 300 may include increasing the flow of fresh air at the particulate filter as the exhaust temperature temporarily increases during an engine shutdown.

Additional details of engine shutdown regeneration are described with regard to FIG. 4, for example. Specifically, the method 400 includes determining, at 410, whether temperature is greater than a threshold temperature value. For example, the method 400 may include determining if temperature has risen during engine shutdown and/or engine rest conditions to above the threshold temperature, or if it was already above a threshold temperature before the engine shutdown. In this way, it can be further determined whether or not to perform engine shutdown regeneration. For example, particulate filter regeneration may be selectively carried out under particular engine shutdown conditions (e.g., shutdowns in which filter temperature is high enough), and not during others. The fresh air to the particulate filter may be drawn in via stored vacuum (or pressure) at different times after the engine has stopped, based on different temperature conditions of the exhaust, for example. Additional parameters may also be monitored at 410, including whether the engine has come to a complete stop, and/or whether stored vacuum level is greater than a threshold level (e.g., whether pressure in the intake manifold is less than a threshold absolute pressure). In the example where pressure is stored in the intake manifold, the method 400 may also include determining whether manifold pressure is above a threshold absolute pressure (e.g., such that it is sufficiently high to push a desired amount of oxygen to the particulate filter).

When the answer to 410 is yes, the method 400 continues to 412 to adjust one or more EGR system parameters and/or intake or exhaust system parameters to draw fresh air through the particulate filter via the vacuum in the intake. In other examples, air may be drawn toward the particulate filter via stored pressure in the intake. The adjusting of the flow through the filter may be based on feedback of various sensors, as described herein.

In one example where a vacuum has been generated in the intake manifold, both the HP-EGR and LP-EGR passages may be used during the particulate filter regeneration, where a compressor bypass is closed (e.g., valved bypass 167 of FIG. 1 is closed), a turbine wastegate is at least partially opened, and the tailpipe valve is closed. In this case, both the HP and LP-EGR valves (e.g., HP-EGR valve 142 and LP-EGR valve 152 of FIG. 1) are each at least partially opened to initiate the flow of fresh air to the particulate filter. Thus, if a vacuum has been generated in the intake manifold, fresh air can be drawn in from intake passage (e.g., by opening a throttle), pass through the LP-EGR passage, and flow through the particulate filter in a reverse direction. That is, the airflow may travel through the particulate filter in a direction opposite to an exhaust gas flow direction when the engine is running, without removing the filter from the exhaust system, and without reconfiguring the position of the particulate filter in the exhaust system. From the particulate filter, the fresh airflow travels around the turbine via the turbine wastegate and then through the HP-EGR passage to the intake manifold.

In another example in which a vacuum has been generated in the intake manifold, fresh air may be drawn in through the particulate filter by opening a tailpipe valve downstream of the particulate filter (if equipped), the turbine wastegate, and/or the HP-EGR valve. In this case, the LP-EGR valve may be closed or the LP-EGR passage may be omitted. The fresh airflow may be drawn in through the tailpipe, pass through the particulate filter in a reverse direction compared to the direction of exhaust during engine combustion operation (e.g., from an atmospheric side of the particulate filter to an engine output side of the particulate filter), past the turbine (e.g., though an at least partially opened wastegate, or through the turbine), and then pass through the HP-EGR passage to enter the intake manifold. This may effectively dissipate the stored vacuum. In this case, the method may further include adjusting the amount of fresh airflow through the filter during engine shutdown conditions and/or the timing of fresh air flow by adjusting the opening of one or more of an HP-EGR valve, an LP-EGR valve, a turbine wastegate, and a tailpipe valve.

In an example where compressed air has been stored in the intake manifold, the LP-EGR system may be closed during filter regeneration or omitted, and a tailpipe valve may be left open during filter regeneration or omitted. In one example, upon opening of the turbine wastegate and/or HP-EGR valve, the compressed air flows from the intake manifold, through the HP-EGR passage to the exhaust, past the turbine (e.g., through an at least partially opened wastegate, or through the turbine), and then through the particulate filter and to the atmosphere, thus flowing through the particulate filter in a first direction consistent with a direction of exhaust flow during engine combustion. Here, one or more of the HP-EGR valve, turbine wastegate valve, or tailpipe valve may be adjusted to control the timing and amount of fresh air flowing past the particulate filter. Note in this example, the airflow during an engine shutdown filter regeneration travels in the same direction as exhaust flow during engine combustion.

In another example, compressed air may be released by opening a tailpipe valve, compressor valved bypass and/or an LP-EGR valve, and closing an HP-EGR valve, for example, thereby pushing the compressed air from the intake side, past the compressor (e.g., via the compressor valved bypass or through the compressor), through the LP-EGR passage, and through the particulate filter in the reverse direction (e.g., from an atmospheric side of the particulate filter to an engine output side of the particulate filter), thus allowing the flow of excess oxygen to bypass the three-way catalyst.

Combinations of the methods provided herein for flowing excess oxygen through the particulate filter may be employed. For example, a first method for flowing compressed air through the particulate filter in a reverse direction may be carried out until pressure in the intake manifold has equalized with pressure in the exhaust passage. Thereafter, a second method for flowing compressed air through the particulate filter in a first direction (e.g., same direction as exhaust flow during engine combustion) may be carried out.

As mentioned, the timing and/or amount of fresh airflow flowing past a particulate filter may be regulated by adjusting one or more of a throttle opening, a compressor valved bypass, a turbine wastegate valve, an HP-EGR valve, and an LP-EGR valve. For example, under higher temperature shutdown conditions, the stored pressure or vacuum may be used at a first, earlier timing following a discontinuation of engine combustion, to take advantage of a high particulate filter temperature. However, under lower temperature conditions, the stored pressure or vacuum may be used at a second, later timing following the discontinuation of engine combustion, to enable the fresh airflow to pass through the filter in coordination with a natural temperature rise at the particulate filter.

The timing and/or amount of fresh airflow may also be regulated based on an amount of excess oxygen detected at the particulate filter by an oxygen sensor. In the case where compressed air or excess oxygen is being pushed through the particulate filter in a direction that is the same as a direction of exhaust flow during engine combustion (e.g., from engine output side to atmosphere), a first oxygen sensor upstream of the particulate filter may provide an excess oxygen measurement upon which airflow adjustments can be made. Further, this approach may also be used during engine running filter regeneration to control an amount of excess oxygen delivered to the filter. Alternatively, in the case where a vacuum is being used to draw air in from the atmosphere and past the particulate filter (e.g., in a reverse direction), a second oxygen sensor downstream of the particulate filter may provide an excess oxygen measurement upon which airflow adjustments are made.

In some cases, it may be possible to adjust engine operation while an engine is still combusting so that during a subsequent engine shutdown, it is possible to generate fresh airflow past the filter to perform particulate filter regeneration. For example, valve positioning and/or engine combustion parameters may be adjusted during one or more last combustions before discontinuing combustion. Furthermore, an engine shutdown regeneration may include a continuation or extension of engine running regeneration, or it may solely be an engine shutdown regeneration (e.g., initiated during engine shutdown), at least under some conditions. Such an engine shutdown may be contrasted with an engine shutdown not having particulate filter regeneration.

Finally, the flowchart of FIG. 5 illustrates a control routine 500 for starting engine combustion after engine shutdown regeneration of the particulate filter, without any other starts between the shutdown regeneration and the current engine start. Specifically, routine 500 adjusts engine operating parameters during engine start based on a state and extent of the regeneration during and/or after engine shutdown.

At 510 of routine 500 it is determined if the vehicle is on by checking if a key is on, in this example. If it is determined that the key is not on, routine 500 may end. In some embodiments, such as when the vehicle has a hybrid-electric propulsion system, the key may have remained on during engine shutdown, and thus other parameters may be checked at 510 to determine if an engine restart is desired.

On the other hand, if it is determined that the key is on, routine 500 proceeds to 512 where it is determined if regeneration was attempted during a previous engine shutdown. In some embodiments, an engine shutdown may be performed without regeneration of the particulate filter (e.g., without drawing in fresh air via stored pressure/vacuum). If it is determined that regeneration was not attempted or successfully completed during a previous engine shutdown, routine 500 may proceed to 522 where the engine is started without adjustments for filter regeneration. This may include starting the engine with a first air-fuel ratio profile, idle speed setpoint, spark timing profile, etc. In one example, an air-fuel ratio of an initial combustion event of the start may be adjusted to be less lean or more rich, in response to a less extensive (or lack of) engine shutdown filter regeneration.

However, if it is determined that an engine shutdown regeneration was attempted and/or successfully completed during a previous engine shutdown, routine 500 may continue to 514 where the state of regeneration is determined. For example, regeneration may have been started, but then discontinued due to an engine start request. As another example, regeneration may have started and been terminated before the regeneration of the particulate filter was completed (e.g., regeneration was partially completed). In further examples, regeneration may have been started but only a portion of stored soot may have been removed by regeneration. Further still, depending on a temperature of the three-way catalyst during a previous engine shutdown regeneration, more or less excess oxygen may have been stored at the three-way catalyst. As such, a state of a three-way catalyst may also be determined at 514.

Once the state of regeneration is determined, routine 500 of FIG. 5 proceeds to 518 where the engine is started (e.g., begin engine combustion). Then routine 500 continues to 520 where engine operating parameters are adjusted based on the state of regeneration. Engine operating parameters may include, but are not limited to, air fuel ratio, spark timing, idle speed setpoint, etc. For example, if the previous engine shutdown regeneration was attempted and only partially completed, there may be less $O_2$ in the three way catalyst than if the regeneration had been more fully carried out. As such, the air fuel ratio may be adjusted during the engine start to be more rich (or less lean) of stoichiometry in order to reduce the excess $O_2$ in the three-way catalyst during the engine start. In some cases, engine operating parameters may be adjusted based on the state of the three-way catalyst.

In another example, the engine may be started in such a way as to continue regeneration if it was not completed during engine shutdown, and/or if an engine shutdown regeneration is ongoing. For example, in a vehicle with a hybrid-electric propulsion system that carried out an engine shutdown regeneration while the engine was still spinning (e.g., driven by a motor), the engine may need to be restarted as the vehicle accelerates, and as such, the engine shutdown regeneration of the particulate filter may not have completed. As such, the air fuel ratio may be adjusted to be lean of stoichiometry and the spark timing may be retarded in order to continue to supply the particulate filter with $O_2$ for regeneration. Therefore, based on the state of the regeneration during engine shutdown, the engine may be started in a manner so as to continue the regeneration or reduce the effects of the regeneration on components such as the three way catalyst.

As described above with reference to the figures, a direct-injection gasoline engine may have a particulate filter coupled to its exhaust system to collect soot generated during operating conditions, such as when the engine is subject to high speed and/or high load. Further, in order to maintain engine efficiency, the particulate filter may be regenerated, at least partially and at least under some conditions, while the engine is shut down. Based on operating conditions and the vehicle system, stored vacuum and/or pressure in the intake may be used to facilitate regeneration of the particulate filter during engine shutdown.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system. It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The invention claimed is:

1. A method for a turbocharged engine, comprising:
generating vacuum during engine operation;
storing the vacuum;
during or after engine shutdown, drawing ambient air through a particulate filter via the stored vacuum and closing a tailpipe valve downstream of the particulate filter, the drawing including drawing the ambient air from an intake system, through an LP-EGR system to the particulate filter to regenerate the particulate filter, and through an HP-EGR system to an intake manifold.

2. The method of claim 1, wherein storing the vacuum includes storing the vacuum in the intake manifold of the engine.

3. The method of claim 1 further comprising regenerating the particulate filter with the ambient air drawn to the particulate filter, responsive to engine rest conditions via a controller.

4. The method of claim 1, wherein drawing ambient air includes drawing the ambient air, by the vacuum, in a reverse flow direction as compared to a direction of exhaust flow during an engine running operation.

5. The method of claim 1, further comprising regenerating the particulate filter during engine running conditions by flowing ambient air through the particulate filter in a first direction, and regenerating the particulate filter after engine shutdown including regenerating the particulate filter during engine rest by drawing ambient air through the particulate filter in a second direction opposite to the first direction.

6. The method of claim 1, further comprising continuing regeneration during and after engine shutdown via the vacuum.

7. The method of claim 1, further comprising, via a controller, adjusting an engine operating parameter during an engine start subsequent to the engine shutdown, based on a particulate filter regeneration during or after the engine shutdown.

8. The method of claim 7, wherein the engine operating parameter is an air-fuel ratio of an initial combustion of the engine start.

9. A method for a turbocharged engine, comprising:
generating vacuum in an intake manifold during engine operation;
storing the vacuum;
during or after engine shutdown, drawing ambient air through a particulate filter via the stored vacuum, drawing the ambient air including drawing the ambient air in from a tailpipe, through the particulate filter, and then through an EGR system to the intake manifold.

10. The method of claim 9, further comprising adjusting an amount of the ambient air during engine rest conditions by adjusting a valve of the engine.

11. The method of claim 10, further comprising, during or after engine shutdown, adjusting the amount of ambient air to the particulate filter via a controller based on an exhaust gas sensor.

12. The method of claim 11, wherein adjusting the amount of ambient air includes adjusting the valve based on a first exhaust gas oxygen sensor located between the engine and the particulate filter while ambient air is being drawn through the particulate filter during engine rest conditions, and where the method further comprises:
during engine running filter regeneration, adjusting flow to the particulate filter based on a second exhaust gas oxygen sensor located between the particulate filter and the tailpipe.

13. A system for controlling operation of exhaust of an engine in a vehicle, comprising:
an intake manifold upstream of a cylinder of the engine;
a turbocharger coupled to the engine;
a particulate filter downstream of the cylinder; and
an electronic controller with instructions stored in non-transitory memory configured to adjust engine actuators to:
generate vacuum during engine operation,
store the vacuum in the intake manifold, and
during or after an engine shutdown, draw ambient air through the particulate filter via the stored vacuum.

14. The system of claim 13, wherein the system further comprises one or more valves, and where the electronic controller is further configured to adjust an amount of ambient air drawn through the particulate filter by adjusting the one or more valves.

15. The system of claim 14, wherein the one or more valves includes at least one of a high pressure EGR valve, a low pressure EGR valve, and a turbocharger wastegate valve.

16. The system of claim 14, further comprising, an LP-EGR system, and an HP-EGR system, where the electronic controller is configured to adjust the one or more valves to draw the ambient air in through an intake system, through the LP-EGR system to the particulate filter to regenerate the particulate filter, and through the HP-EGR system to the intake manifold, via the vacuum in the intake manifold.

17. The system of claim 14, further comprising an EGR system, where the electronic controller is configured to adjust the one or more valves to draw the ambient air in through a tailpipe of the vehicle, through the particulate filter to regenerate the particulate filter, and through the EGR system to the intake manifold, via the vacuum in the intake manifold.

18. The system of claim 14, where the electronic controller is configured to initiate regeneration of the particulate filter during engine running conditions by flowing ambient air through the particulate filter in a first direction, and continue the regeneration after engine shutdown by drawing the ambient air through the particulate filter via the vacuum by flowing ambient air through the particulate filter in a second, reverse, direction.

19. The system of claim 13, where the electronic controller is configured to commence regeneration of the particulate filter during engine running conditions, and continue the regeneration during and after engine shutdown via the vacuum.

* * * * *